United States Patent [19]

Iida et al.

[11] Patent Number: 5,021,875
[45] Date of Patent: Jun. 4, 1991

[54] AUTOMATIC WHITE-BALANCE ADJUSTING APPARATUS WITH REDUCED SENSITIVITY TO TRANSIENT LIGHT CONDITIONS

[75] Inventors: Takashi Iida; Hiroshi Kiten; Toru Ishii; Takeya Tsukamoto, all of Osaka, Japan

[73] Assignee: Minolta Camera Kabushiki Kaisha, Osaka, Japan

[21] Appl. No.: 465,533

[22] Filed: Jan. 17, 1990

Related U.S. Application Data

[63] Continuation of Ser. No. 156,028, Feb. 16, 1988, abandoned.

[30] Foreign Application Priority Data

Feb. 18, 1987 [JP] Japan .................................. 62-36773
Feb. 18, 1987 [JP] Japan .................................. 62-36775

[51] Int. Cl.$^5$ .............................................. H04N 9/73
[52] U.S. Cl. ..................................... 358/29 C; 358/41; 358/43; 358/44
[58] Field of Search ..................... 358/29 C, 41, 43, 44

[56] References Cited

U.S. PATENT DOCUMENTS

| | | | |
|---|---|---|---|
| 4,368,482 | 1/1983 | Machida et al. | 358/29 C |
| 4,506,290 | 3/1985 | Hashimoto | 358/29 C |
| 4,584,598 | 4/1986 | Kutaragi | 358/29 C |
| 4,595,946 | 6/1986 | Uehara et al. | 358/29 C |
| 4,602,277 | 7/1986 | Guichard | 358/29 C |
| 4,605,955 | 8/1986 | Hashimoto et al. | 358/29 |
| 4,682,210 | 7/1987 | Ikemura et al. | 358/29 C |
| 4,736,241 | 4/1988 | Murakami et al. | 358/29 C |

FOREIGN PATENT DOCUMENTS

| | | | |
|---|---|---|---|
| 57-127376 | 8/1982 | Japan . | |
| 60-203093 | 10/1985 | Japan | 358/29 C |
| 60-240291 | 11/1985 | Japan | 358/29 C |
| 60-253936 | 12/1985 | Japan | 358/29 C |
| 61-92091 | 5/1986 | Japan . | |
| 61-101188 | 5/1986 | Japan . | |
| 61-181278 | 8/1986 | Japan . | |

OTHER PUBLICATIONS

National Technical Report vol. 31, No. 1, Feb. 1985, pp. 90–97, "Automatic-Tracing White Balance System for Color Video Cameras", Tomio Shimizu et al.

Primary Examiner—James J. Groody
Assistant Examiner—Kim Yen Vu
Attorney, Agent, or Firm—Burns, Doane, Swecker & Mathis

[57] ABSTRACT

An automatic white balance adjusting apparatus having a light measuring circuit, a determining circuit, and adjusting circuit and a time-average calculating circuit, in operation, color temperature adjustment data are calculated by using a value obtained by averaging color temperature information of a light source over a predetermined time period.

11 Claims, 5 Drawing Sheets

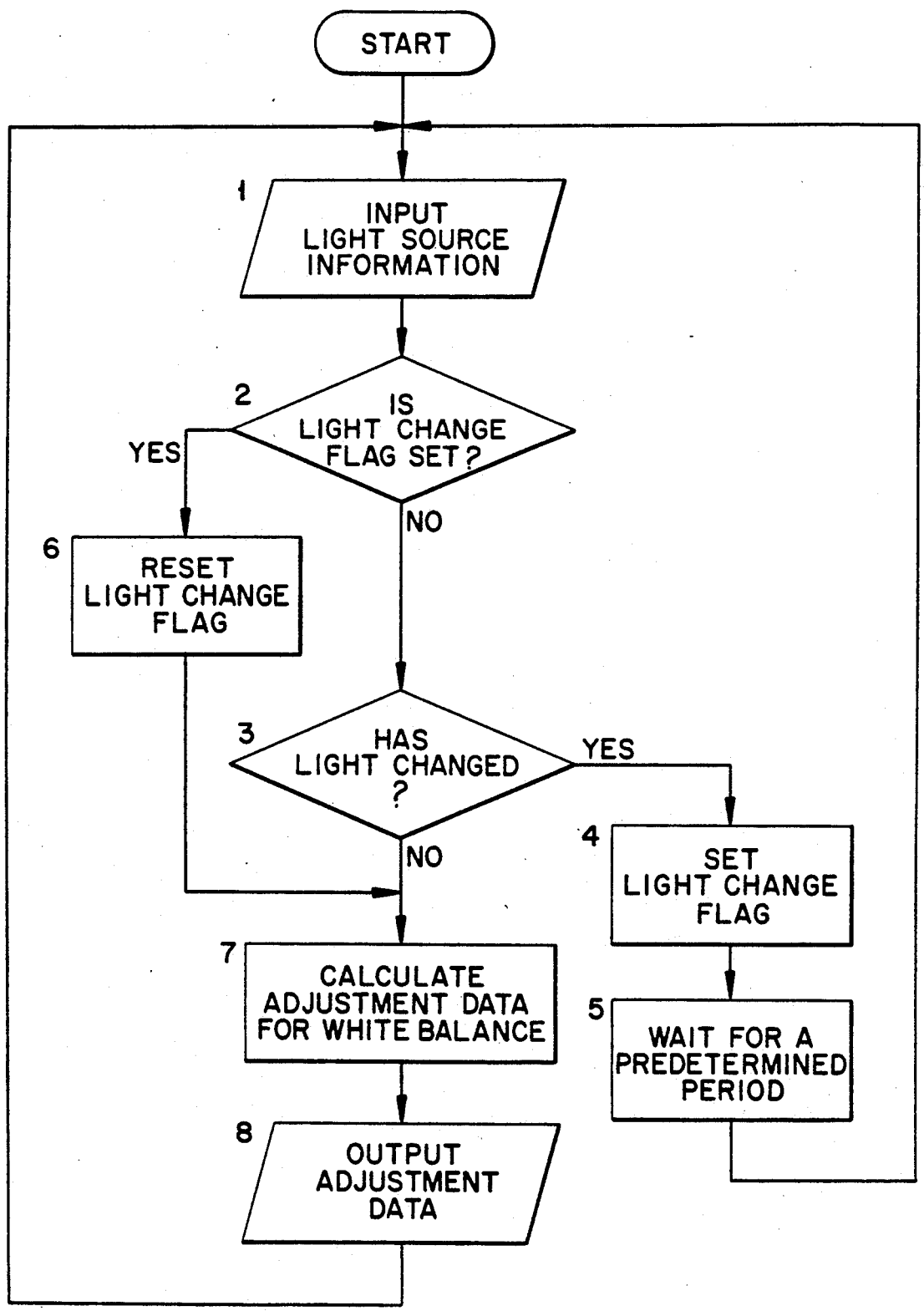

AUTOMATIC WHITE-BALANCE ADJUSTING APPARATUS WITH REDUCED SENSITIVITY TO TRANSIENT LIGHT CONDITIONS

This application is a continuation, of application Ser. No. 07/156,028, filed Feb. 16, 1988, now abandoned.

BACKGROUND OF THE INVENTION (1) Field of the Invention

The present invention relates to an automatic white-balance adjusting apparatus for automatically carrying out a white-balance adjustment operation needed for correctly reproducing colors in a video camera, an electronic still camera or the like depending on a color temperature of a light source, and more particularly to an improved automatic white-balance adjusting apparatus of the above-noted type comprising light measuring means for generating a light measurement signal by receiving light from a light source, determining means for calculating and determining color temperature adjustment data for a white-balance adjustment operation from color temperature information of the light source obtained from the light measurement signal from the light measurement means and adjusting means for adjusting a white-balance based on the color temperature adjustment data.

(2) Description of the Prior Art

A white-balance adjustment operation by a conventional white-balance adjusting apparatus is carried out by using color temperature information obtained by color temperature sensors each time a switch attached to a video camera or the like is depressed or at every predetermined time interval.

However, according to the above construction, even if a momentary change in the light illuminating an object to be photographed unexpectedly occurs, or light reflected from another object having a high brightness value is momentarily incident onto the sensors, a white-balance adjustment signal is generated based on a color temperature measured at that particular moment. Therefore, since the white-balance adjustment signal varies even with a momentary change in the color temperature, instability or inaccuracy in the color reproduction occurs.

In view of the above-noted state of the art, it is a primary object of the present invention to provide an automatic white-balance adjusting apparatus capable of achieving stable and accurate color reproduction. In accordance with the invention, the white-balance adjustment condition does not change significantly even if a violent and sudden change occurs during the light in the course of an image recording operation using a video camera, an electronic still camera or the like.

It is another object of the present invention to provide an automatic white-balance adjusting apparatus capable of maintaining the white-balance adjustment condition constant in case such a sudden change in the light disappears at once.

SUMMARY OF THE INVENTION

In order to accomplish the above objects, one preferred embodiment of the present invention for automatically carrying out a white-balance adjustment operation by measuring the color temperature of a light source and determining color temperature adjustment data, comprises means for averaging light measurement values of a light source for a predetermined time period.

According to another preferred embodiment of the present invention, an automatic white-balance adjusting apparatus comprises means for judging a light source whereby the color temperature adjustment data is not changed for a predetermined time period when there occurs a change in the light source.

In the case of the automatic white-balance adjusting apparatus having the above-described constructions, the averaging means chronologically averages color temperature information obtained at different times. Accordingly, even if a transitional or momentary change in the color temperature information occurs because of the incidence of light from another light source, the variation ratio is advantageously leveled by the chronological averaging operation whereby the color temperature adjustment data to be utilized for a white-balance adjustment does not change significantly. Thus, as compared with the aforementioned conventional apparatus which uses the adjustment data obtained from color temperature information obtained at a single time the variation in the adjustment condition may be minimized and the color reproducibility of the image may be improved.

Furthermore, in the automatic white-balance adjusting apparatus relating to the present invention, a renewal operation of the color temperature adjustment data is inhibited for a predetermined time period when a change in the light source occurs and color temperature adjustment data in accordance with the kind of light source detected after the time period is used for the white-balance adjustment operation. Therefore, if a light from another light source is momentarily incident on the apparatus and then disappears, the color temperature adjustment data does not change at all. On the other hand, if the change continues after the predetermined time period when e.g. the light source for irradiating the object is replaced, the white-balance adjustment operation is carried out in accordance with the new light source.

As described above, with the automatic white-balance adjusting apparatus of the present invention, the white-balance adjustment condition is not inadvertently renewed or does not change violently even if there occurs a transitional or momentary change in the output signal from the light measuring means due to a momentary change in the light source or in the illumination condition or due to external noises or the like, and the white-balance adjustment condition is not inadvertently renewed or violently changed by the chronological averaging operation if such change lasts only within the predetermined time period, whereby a reproduced image will have stable color.

Other features, objects and advantages of the present invention will become apparent from the following description of the preferred embodiments with reference to the accompanying drawings.

BRIEF DESCRIPTION OF THE DRAWINGS

Accompanying drawings illustrate preferred embodiments of an automatic white-balance adjusting apparatus related to the present invention; in which, FIG. 5 is a flow chart illustrating output operations of adjustment data in the second embodiment.

DESCRIPTION OF THE PREFERRED EMBODIMENTS

Figure 1:
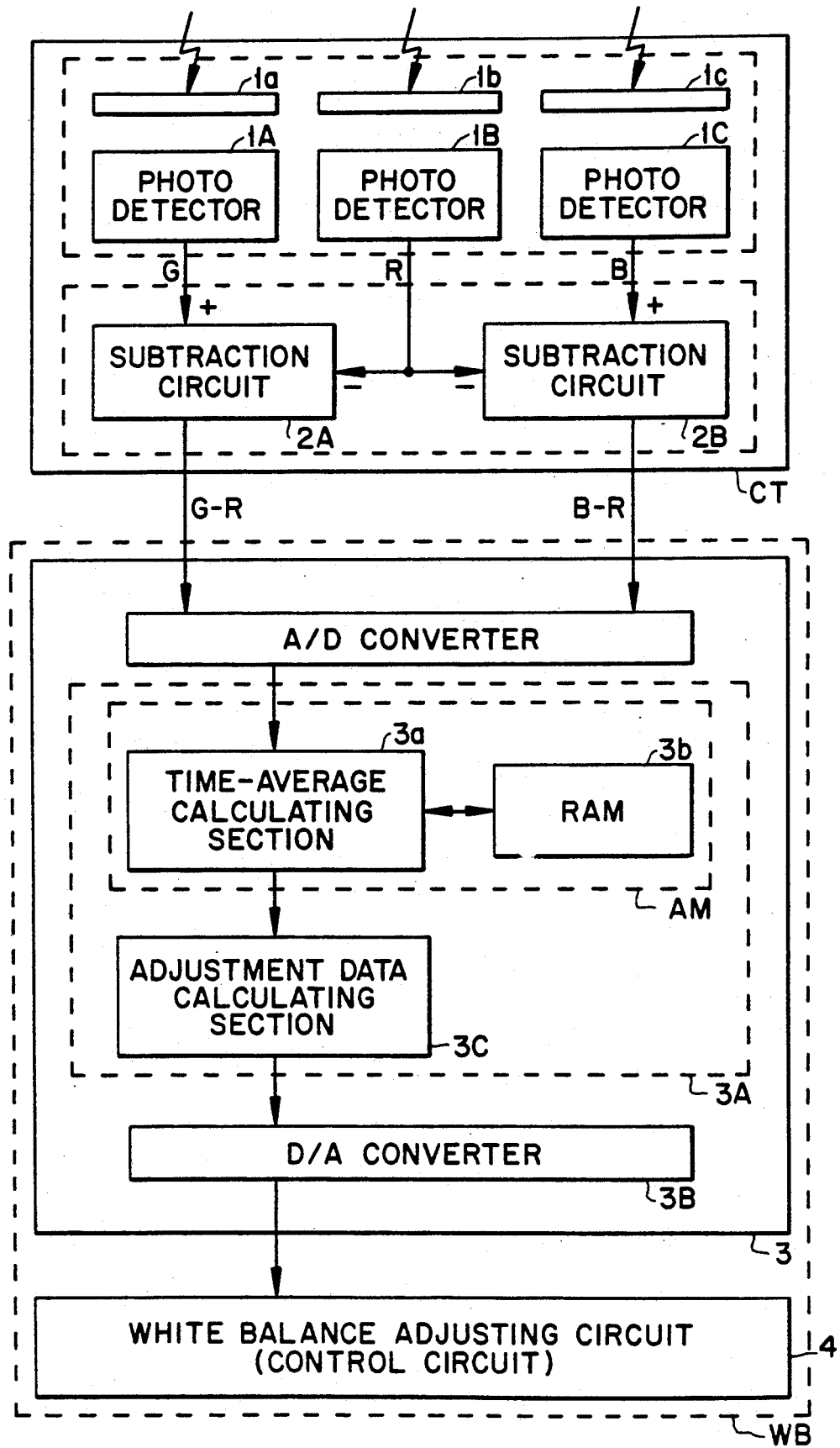
FIG. 1 is a block diagram illustrating a first preferred embodiment of the present invention.

FIG. 1 is a block diagram of an automatic white-balance adjusting apparatus related to the present invention mounted to a video camera.

A reference numeral 1 denotes a light receiving section for generating a light measuring signal by receiving a light from a light source. This receiving section 1 includes three photoelectric transducing elements 1A, 1B and 1C and three color filters 1a, 1b and 1c respectively for filtering green light, red light and blue light. In operation, the respective photoelectric transducing elements 1A, 1B and 1C generate as light measurement signals a photoelectrically transferred and logarithmically compressed green signal G, a red signal R and a blue signal B.

This light measurement signal from the light receiving section 1 is successively input to two amplifier circuits 2A and 2B of an operational circuit 2. The first amplifier circuit 2A generates a G/R signal subtracting the R signal from the G signal and amplifying the same. On the other hand, the second amplifier circuit 2B generates a B/R signal subtracting the R signal from the B signal and amplifying the same. The G/R signal and the B/R signal are generated from the operational circuit 2 as color temperature information of a light source illuminating the object and the signals are then input to a microcomputer 3A through an AD (analog to digital) conversion function.

That is to say, this operational circuit 2 acts as an operational section for calculating and generating the color temperature information of the light source by the light measurement signal output from the light receiving section 1. Also, this operational section 2 and the light receiving section 1 together constitute light measuring means CT.

The microcomputer 3A uses the color temperature information of the light source including the G/R signal and the B/R signal output from the operational circuit 2 and effects a digital calculation to obtain adjustment data for a white-balance adjustment operation in accordance with the color temperature. This digital adjustment data is input to a DA (digital to analog) converter circuit 3B to be converted to an analog adjustment signal. Based on this adjustment signal, a control circuit 4 acting as an adjustment section effects a white-balance adjustment operation.

That is, the microcomputer 3A and the DA converter circuit 3B together constitute an output section 3 for generating the adjustment signal for a white-balance adjustment operation. Furthermore, this output section 3 and the control circuit 4 acting as an adjustment section together constitute white-balance adjustment means WB.

In the microcomputer 3A, an average calculating section 3a receives at a plurality of different times the color temperature information from the operational circuit 2 and stores the same at an incorporated RAM (random access memory) 3b. With the completion of a predetermined number of color temperature information input operations, the color temperature information is taken out of the RAM 3b and then averaged. Based on this average color temperature information obtained by the average calculating section 3a, an adjustment data calculating section 3C of the microcomputer 3A calculates adjustment data for the white-balance adjustment operation and generates the same through the DA converter circuit 3B.

As a result, even if there temporarily occurs some change in the color temperature information output from the operational circuit 2 as the result of a light from a different light source being momentarily applied onto the object or an object having a high brightness value crossing the photographic optical path, since the average calculating section 3a averages the color temperture information, it is possible to prevent any considerable displacement from occurring in the white-balance adjustment operation due to a temporary color temperature information variation.

That is, the average calculating section 3a and the RAM 3b of the microcomputer 3A together constitute averaging means AM for chronologically averaging the color temperature information transferred from the operational circuit 2 of the light measuring means CT to the adjustment data calculating section 3C of the white-balance adjusting means WB.

In this embodiment, the averaging means AM is provided in the microcomputer 3A per se constituting the output section 3 of the white-balance adjusting means WB. Alternatively, the averaging means AM may also be provided in the operational circuit 2 per se acting as an operational section of the light measuring means CT, or may be provided as an independent circuit between the operational circuit 2 and the microcomputer 3A. In these ways, the specific construction and disposition of the averaging means AM may be conveniently varied.

Figure 2:
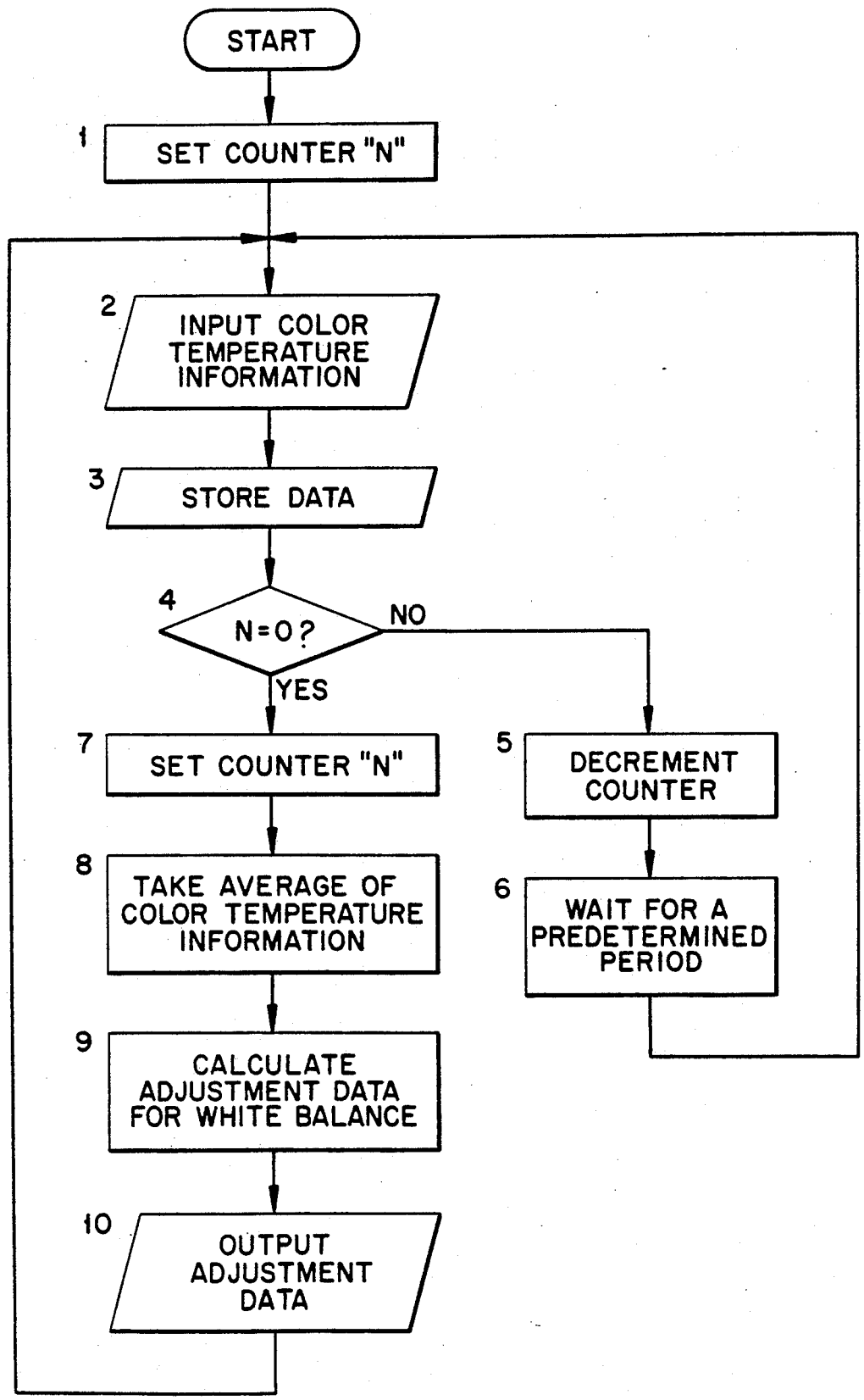
FIG. 2 is a flow chart illustrating output operations of adjustment data in the first embodiment.

Next, the output operations of the adjustment data effected in the microcomputer 3A will be particularly described with reference to a flow chart in FIG. 2.

With a power-on of the video camera, the microcomputer 3A is reset and this flow chart is started. At step #1, a read counter is set. This read counter is for determining the number of times the color temperature information is input from the light measuring means CT and is set to a value '5' for example.

Thereafter, at step #2, the color temperature information i.e. the G/R signal and the B/R signal are input from the light measuring means CT. At step #3, this color temperature information is stored in the incorporated RAM 3b, and it is determined at step #4 whether the read counter carries the value of '0' or not.

If the read counter does not carry the value of '0', this means that the information input operation has not yet been carried out for the set number of times (five times in this case), and then this read counter is decremented at step #5. At step #6, the process waits for a predetermined time period so as to reduce disadvantageous effects due to flickers e.g. of a fluorescent lamp and then returns to step #2 to repeat the above operations.

On the other hand, if it is judged that the read counter carries the value of '0', this means that the information input operation has been carried out for the set number of times (five times in this case), and then this read counter is set again at step #7. Then, the color temperature information stored at the RAM 3b is taken out to be averaged at step #8.

At step #9, based on the average color temperature information obtained by the above average calculation, adjustment data for a white-balance adjustment operation is calculated. After this adjustment data is output to the DA converter circuit 3B at step #10, the process returns to step #2 to repeat the above operations.

In this embodiment, it is to be noted, the averaging means AM inputs the color temperature information from the light measuring means CT for five times and then averages the same. In place of this, for example, it is also possible to adapt the averaging means AM to input and integrate continuously generated color temperature information and then to average the same. In this way, the specific construction of the averaging means AM may be conveniently varied.

Figure 3:
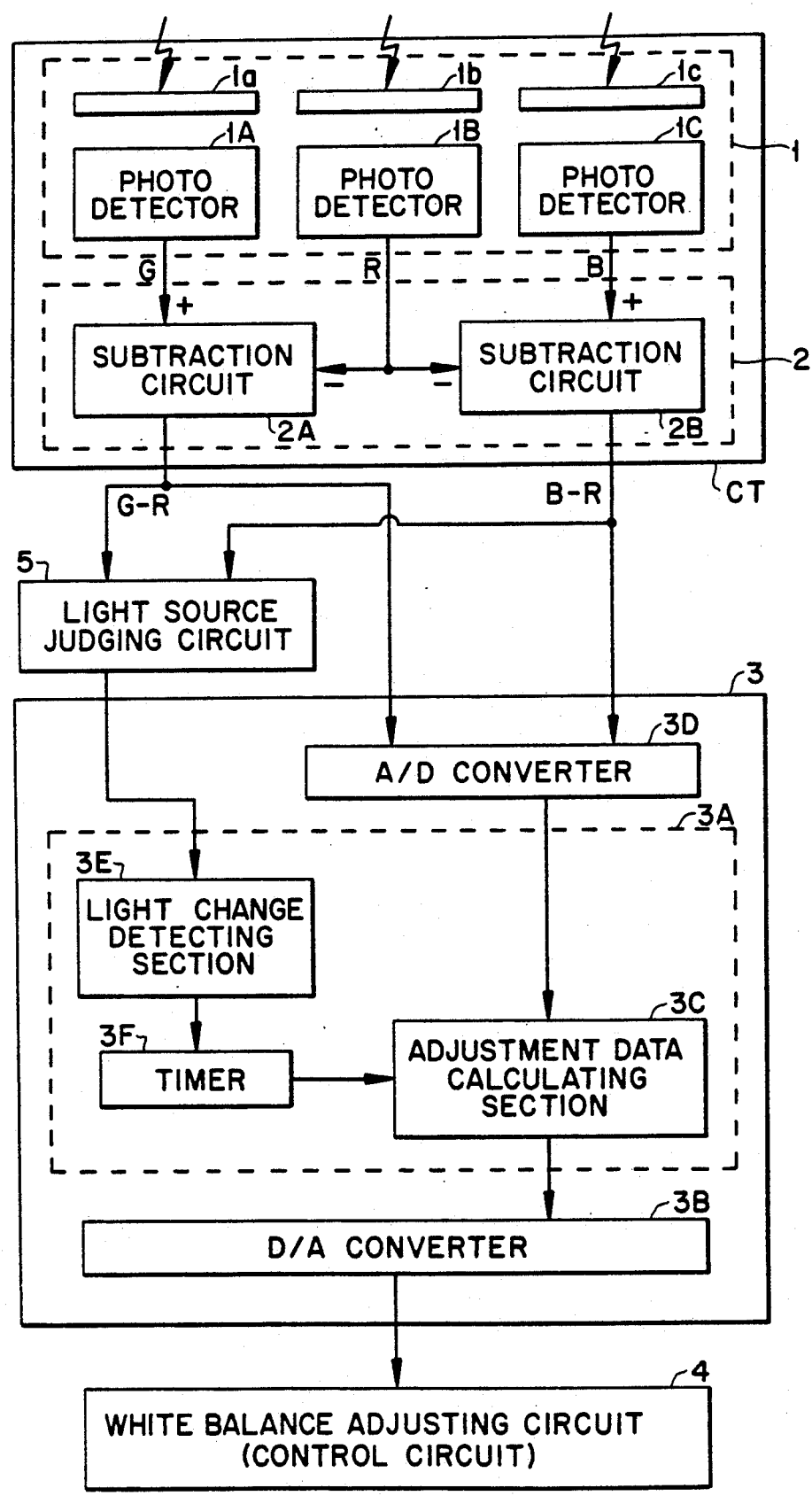
FIG. 3 is a block diagram illustrating a second preferred embodiment of the present invention.

FIG. 3 is a block diagram of an automatic white-balance adjusting apparatus according to another preferred embodiment of the present invention with the apparatus being mounted to a video camera.

In this FIG. 3, the components denoted by the same reference marks are the same as those components shown in FIG. 1.

The color temperature information of the light received from the light source is input from the operational circuit 2 of the light measuring means CT to a light source judging circuit 5. By utilizing this color temperature information, the light source judging circuit 5 judges the light source and generates the same as light source information to the microcomputer 3A. Also, the B/R signal is directly digitized through the A/D converter 3D and is output as color temperature information to the microcomputer 3A.

The construction and functions of the light source judging circuit 5 will be particularly described later.

By utilizing the light source information output from the light source judging circuit 5, the adjustment data calculating section 3C of the microcomputer 3A effects a digital calculation of the white-balance adjustment operation suitable for the light source. This digital data is input to the DA converter circuit 3B and undergoes an analog conversion operation to be generated as an adjustment signal. Based on this adjustment signal, the control circuit 4 acting as an adjusting section carries out a white-balance adjustment operation.

That is to say, the microcomputer 3A and the DA converter circuit 3B together constitute the output section 3 for generating the adjustment signal for a white-balance adjustment operation. Also, this output section 3 and the respective control circuit 4 acting as an adjusting section together constitute white-balance adjusting means WB.

Next, the construction and functions of the above-described light source judging circuit 5 will be particularly described with reference to FIG. 4.

Figure 4:
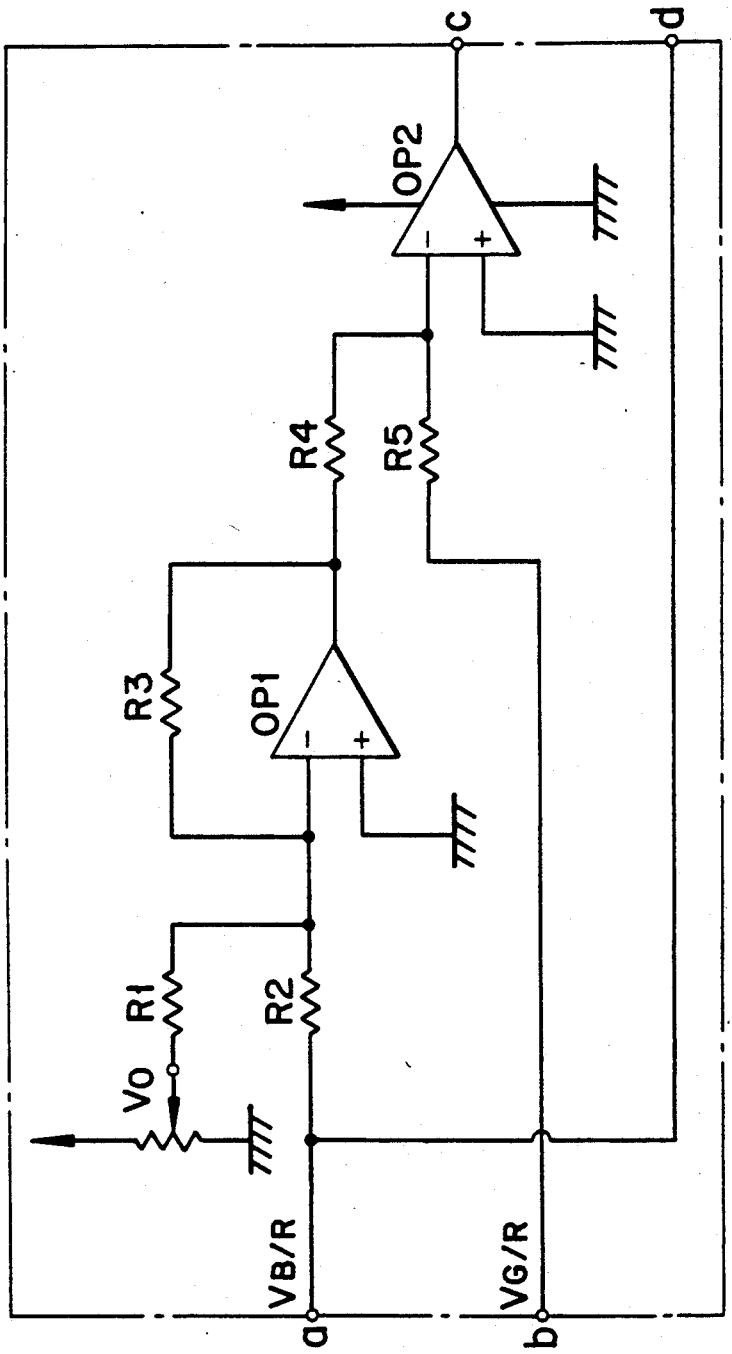
FIG. 4 is a circuit diagram of a light source judging circuit used in the second embodiment.

An input terminal 'a' shown at an upper left side of FIG. 4 receives the B/R signal from the operational circuit 2 of the light measuring means CT; whereas, an input terminal 'b' shown at a lower left side of the same figure receives the G/R signal from the same. A reference mark VR denotes a variable resistor for generating a reference voltage $V_o$ for the judging operation.

The B/R signal $V_{B/R}$ from the operational circuit 2 is added by a first operational amplifier OP1 to the reference voltage $V_o$ and then inverted. The added signal ($V_{B/R}+V_o$) is further added to the G/R signal $V_{G/R}$ from the operational circuit 2 at an inverter input terminal of a second operational amplifier OP2.

If the light source is a blackbody light source such as the sun or an incandescent lamp, the following expression is established:

$$V_{G/R}-V_{B/R} \leqq V_o$$

Thus, the output from the second operational amplifier OP2 becomes a power source voltage $V_{cc}$, i.e. in the state of 'H'.

On the other hand, if the light source is a flourescent lamp, the following expression is established:

$$V_{G/R}-V_{B/R}>V_o$$

Thus, the output from the second operational amplifier OP2 becomes the GND level, i,e, in the state of 'L'.

This output from the second operational amplifier OP2 which changes its state depending on whether the light source is the black body or the fluorescent lamp is output as a light source information signal from an output terminal 'c' of the light source judging circuit 5, and then is input as light source information to the microcomputer 3A.

In the above case, the light source judging operation by the light source judging circuit 5 is effected by utilizing the color temperature information of the light source. In place of this arrangement, though not shown, if the light source is to be judged between the sun and a fluorescent lamp since the light from the fluroescent lamp flickers in the frequency of commerical electric power (100 Hz or 120 Hz), it is alternately possible to distintuish the light source between the sun and a fluorescent lamp by detecting presence or absence of this flickering.

Terminal d of FIG. 4 is provided for reasons unrelated to the present invention that will not be further described herein.

The light source information is input to the microcomputer 3A and light source change detecting means 3E detects whether or not any change has occurred in the light source information. With detection of a change in the light source information by the light source change detecting means 3E, the adjustment data calculating section 3a fixes the adjustment data to the value calculated based on the previous light source imnformation and at the same time a timer 3F is started.

With a timing-up of this timer 3F after a predetermined time period, the adjustment data calculating section 3C calculates adjustment data based on the present judgement light source information and outputs this adjustment data to the DA converter circuit 3B. This adjustment data, as described hereinbefore, is converted into an analog adjustment signal through the DA converter circuit 3B and by using this adjustment signal the control circuit 4 carries out a white-balance adjustment operation.

When the light source change detecting means 3E detects a change in the light source information, if this change is non-momentary and therefore continues after a predetermined time period (e.g. where the light source illuminating the object has been replaced), after the timing-up of the timer 3F, the adjustment data calculating section 3b calculates and generates adjustment data by using the new light source information. Accordingly, with this renewal of the adjustment signal to the control circuit 5, the white-balance adjustment condition is also renewed.

On the other hand, if the change in the light source in foramtion is only of a transitional nature and thus does not continue after the predetermined time period determined by the timing-up of the timer 3F, the output of the light measuring means CT returns to its original state, and the output from the adjustment data, calculating section 3C maintains its original value. Accordingly, there occurs no change in the adjustment signal to the control circuit 4 and the white-balance adjustment condition remains unchanged also.

Therefore, even if a temporary change in the light source information occurs which is output from the light source judging circuit 5 due to a momentary change in the light source, a momentary change in the illumination condition of the object or some external noise, if this change continues only with the predetermined time period, the white-balance adjustment condition is not inadvertently changed.

That is to say, the data calculating section 3C, the timer 3F and the light source change detecting means 3E together constitute determining means for inhibiting renewal of the adjustment signal for a predetermined time period after a change in the output signal from the light source judging circuit 5 thereby inhibiting inadvertent renewal of the white-balance adjustment condition.

The output operations of the adjustment data effected in the microcomputer 3A will be particularly described hereinafter with reference to a flow chart in FIG. 5.

With a power-on of the video camera, the microcomputer 3A is reset and this flow chart is started. At step #1, the light source information which is the output signal from the light source judging circuit 5 is input, and then it is judged at step #2 whether a light source change flag is set or not.

This light source change flag is set when the presently input light source information differs from the light source information stored at the memory in the previous routine. Since this flag is not set in the first routine, the process goes on to step #3 to judge, as described hereinbefore, whether or not the presently input light source information differs from the stored light source information, i.e. whether or not there has occured any change in the light source information.

If no change is detected in the light source information, adjustment data for a white-balance adjustment operation is calculated based on the presently input judgement light source information at step #7 and this adjustment data is output to the DA converter circuit 3B at step #8. Thereafter, the process returns to step #1 to repeat the above operations.

On the other hand, if a change is detected in the light source information, as described hereinbefore, the light source change flag is set at step #4, and at step #5 the process waits for a timing-up of the timer for inhibiting the renewal of the adjustment data for the predetermined time period. Thereafter, the process returns to step #1 to input again judgement light source information.

When the light source information is input after returning from step #5, since the light source change flag is set, the process goes on to step #6 based on a judgement at step #2.

At step #6, the light source change flag is reset, and then in the same manner as the previous case, adjustment data is calculated at step #7 and the same is generated at step #8. Thereafter, the process returns to step #1 repeat the above operations.

That is to say, if the light source information input after returning from step #5 is the same as the light source information input during the routine in which the light source information change was detected at step #3, since the adjustment data is calculated and generated based on this adjustment light source information, the white-balance adjustment condition is renewed.

On the other hand, if the judgement light source information input after returning from step #5 differs from the light source information input during the routine in which a change in the light source information was detected at step #3, (i.e. the light source information has returned to the original light source information) since the adjustment data is calculated and generated based upon this light source information, the white-balance adjustment condition remains unchanged.

Simultaneously with the output of the adjustment data at step #8, it is to be noted, the light source information input immediately therebefore is newly stored at the memory described hereinbefore.

In the above-described embodiment, it is assumed that the light source comprises the sun or a fluorescent lamp, and the light source judging circuit 5 judges which of these the light source comprises. However, it is also possible to adapt this light source judging circuit 5 to distinguish from more than three kinds of light sources whereby a white-balance adjustment operation may be carried out more finely based on the result of the above judgement.

The light source judging circuit 5 may be alternately constructed to effect the judgement by directly using the outputs from the photoelectric transducing elements 1A, 1B, and 1C of the light measuring means CT.

Also, the automatic white-balance adjusting apparatus related to the present invention may be utilized, in addition to the video camera described in the previous embodiment, in e.g. and electronic still camera recording a still image on a magnetic disk.

What is claimed is:

1. An automatic white-balance adjusting apparatus comprising:
    light measuring means for generating a light measurement value of a scene by receiving light from a light source illuminating said scene;
    color temperature detecting means for detecting the color temperature of said light source based on the light measurement value of said scene and generating color temperature data;
    averaging means for periodically inputting the color temperature data and calculating a time-average color temperature of said scene by averaging a predetermined number of the inputted color temperature data;
    determining means for determining color temperature adjustment data based on said average value; and
    adjusting means for carrying out a white-balance adjustment operation by adjusting the color balance of an image signal based on the color temperature adjustment data.

2. An automatic white-balance adjusting apparatus as defined in claim 1, wherein said color temperature detecting means includes A/D converter means which periodically converts the light measurement value into a digital value, wherein said averaging means includes storing means for storing the predetermined number of the digital values periodically converted by said A/D converter means and calculating means for calculating a time average value of the stored digital representing light measurement values of said scene values and wherein said determining means includes D/A converter means for converting the determined color temperature adjustment data into an analog output signal.

3. An automatic white-balance adjusting apparatus as defined in claim 2, wherein said light measuring means includes:
- a light receiving section for separating the light from the light source into red, green and blue color components and for generating three color signals respectively corresponding to the three color components; and
- an operational section for picking out two color signals from the three color signals and calculating a ratio of the two color signals;

said light measuring means generating the calculated ratio as the light measurement value.

4. An automatic white-balance adjusting apparatus comprising:
- light measuring means for generating a light measurement value by receiving light from a light source;
- light source judging means for judging the kind of the light source based on the light measurement value and generating light source information;
- determining means for periodically producing color temperature adjustment data based on the light measurement value and for detecting a change in the kind of the light source based on the light source information, said determining means maintaining previous color temperature adjustment data for a predetermined time period if a change in the kind of the light source is detected and producing new color temperature adjustment data if no change in the kind of the light source is detected; and
- adjusting means for carrying out a white-balance adjustment operation based on color temperature adjustment data produced by the determining means.

5. An automatic white-balance adjusting apparatus as defined in claim 4, wherein the maintained previous color temperature adjustment data comprises color temperature adjustment data produced by said determining means before the detection of the change in the kind of the light source.

6. An automatic white-balance adjusting apparatus as defined in claim 4, wherein said light measuring means includes:
- a light receiving section for separating the light from the light source into red, green and blue color components and for generating three color signals respectively corresponding to the three color components; and
- an operational section for picking out from the three color signals a first combination of two color signals and a second combination of two color signals different from the first combination and for calculating two ratios respectively representing a first ratio of the two color signals in the first combination and a second ratio of the two color signals in the second combination, one of the two color signals in the second combination being different from the two color signals in the first combination;

said light measuring means generating the calculated ratios as the light measurement value.

7. An automatic white-balance adjusting apparatus as defined in claim 6 wherein said light source judging means judges the kind of the light source based on a comparison between the two ratios calculated by said operational section of the light measuring means.

8. An automatic white-balance adjusting apparatus comprising:
- light measuring means for generating a light measurement value by receiving light from a light source;
- light source judging means for judging the kind of the light source based on the light measurement value and generating light source information;
- determining means including an A/D converter for periodically converting the light measurement value into a digital data for periodically producing color temperature adjustment data based on the digital data and for detecting a change in the kind of the light source based on the light source information, said determining means maintaining previous color temperature adjustment data for a predetermined time period if a change in the kind of the light source is detected and producing new color temperature adjustment data if no change in the kind of the light source is detected; and
- adjusting means for carrying out a white-balance adjustment operation based on the color temperature adjustment data produced by said determining means.

9. An automatic white-balance adjusting apparatus as defined in claim 8, wherein the maintained previous color temperature adjustment data comprises color temperature adjustment data produced by said determining means before the detection of the change in the kind of the light source.

10. An automatic white-balance adjusting apparatus as defined in claim 8, wherein said light measuring means includes:
- a light receiving section for separating the light from the light source into red, green and blue color components and for generating three color signals respectively corresponding to the three color components; and
- an operational section for picking out from the three color signals a first combination of two color signals and a second combination of two color signals different from the first combination and for calculating two ratios respectively representing a first ratio of the two color signals in the first combination and a second ratio of the two color signals in the second combination, one of the two color signals in the second combination being different from the two color signals in the first combination;

said light measuring means generating the calculated ratios as the light measurement value.

11. An automatic white-balance adjusting apparatus as defined in claim 10, wherein said light source judging means judges the kind of the light source based on a comparison between the two ratios calculated by said operational section of the light measuring means.

* * * * *